United States Patent
Wallner et al.

(10) Patent No.: US 6,176,515 B1
(45) Date of Patent: Jan. 23, 2001

(54) INFLATABLE CURTAIN WITH POSITIONING DEVICE

(75) Inventors: John P. Wallner, Rochester Hills, MI (US); James K. O'Docherty, Mesa, AZ (US); John P. O'Loughlin, Gilbert, AZ (US); Kenneth D. Brannon, Mesa, AZ (US)

(73) Assignees: TRW Vehicle Safety Systems Inc.; TRW Inc., both of Lyndhurst, OH (US)

( * ) Notice: Under 35 U.S.C. 154(b), the term of this patent shall be extended for 0 days.

(21) Appl. No.: 09/414,257

(22) Filed: Oct. 7, 1999

(51) Int. Cl.[7] ................................................... B60R 21/22
(52) U.S. Cl. ........................................ 280/730.2; 280/729
(58) Field of Search ........................... 280/728.1, 728.2, 280/730.1, 730.2, 729

(56) References Cited

U.S. PATENT DOCUMENTS

| | | | |
|---|---|---|---|
| 3,687,485 | * 8/1972 | Campbell | 280/733 |
| 5,788,270 | 8/1998 | Haland et al. . | |
| 5,865,462 | 2/1999 | Robins et al. . | |
| 6,073,961 | * 6/2000 | Bailey et al. | 280/730.2 |
| 6,095,551 | * 8/2000 | O'Docherty | 280/730.2 |

FOREIGN PATENT DOCUMENTS

| | | | |
|---|---|---|---|
| 5-131889 | * 5/1993 | (JP) | 280/729 |
| 9743146 | 11/1997 | (WO) . | |

* cited by examiner

*Primary Examiner*—Paul N. Dickson
*Assistant Examiner*—Faye M. Fleming
(74) *Attorney, Agent, or Firm*—Tarolli, Sundheim, Covell, Tummino & Szabo L.L.P.

(57) ABSTRACT

An apparatus (10) for helping to protect an occupant of a vehicle (12) that has a side structure (16) comprises a vehicle occupant protection device (14) which is inflatable into a position between the side structure of the vehicle and a vehicle occupant. The vehicle occupant protection device (14), when inflated, has an outer panel (47) positioned adjacent to the side structure (16) and an opposite inner panel (48). Apertures (70) are spaced in a row and extend through the device (14). First and second flexible elongated members (80 and 82) have respective first ends (84 and 94) and opposite second ends (86 and 96) connected to the side structure (16). The first and second flexible elongated members (80 and 82) extend through the apertures (70) and have respective first and second portions (102 and 110) which extend along respective first and second parts (104 and 112) of the outer panels (47) and then along respective first and second parts of the inner panels (48). When the vehicle occupant protection device (14) is inflated, the first and second portions (102 and 110) move away from each other and tension the first and second flexible elongated members (80 and 82).

12 Claims, 2 Drawing Sheets

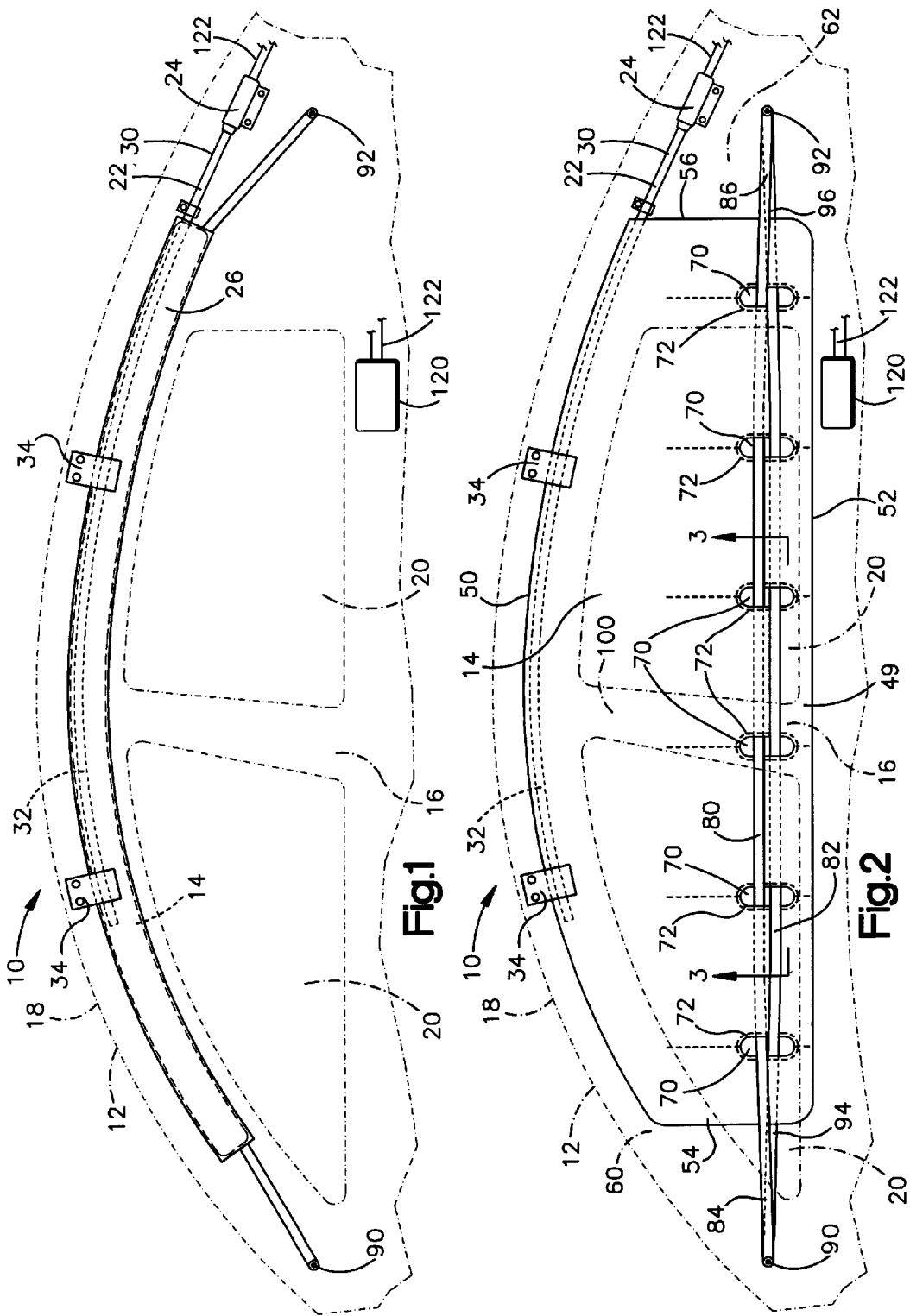

INFLATABLE CURTAIN WITH POSITIONING DEVICE

FIELD OF THE INVENTION

The present invention relates to an inflatable vehicle occupant protection device for helping to protect a vehicle occupant in the event of a side impact to a vehicle and/or a vehicle rollover.

BACKGROUND OF THE INVENTION

It is known to inflate a vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. Such an inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure. The apparatus includes a vehicle occupant protection device that is inflatable into a position between the side structure of the vehicle and a vehicle occupant. The vehicle occupant protection device when inflated has an outer panel positioned adjacent to the side structure and an opposite inner panel. Apertures are spaced in a row and extend through the device.

A first flexible elongated member has first and second opposite ends connected to the side structure. The first flexible elongated member extends through the apertures and has first portions which extend along first parts of the outer panel and then along first parts of the inner panel. A second flexible elongated member also has first and second opposite ends connected to the side structure. The second flexible elongated member extends through the apertures and has second portions which extend along second parts of the outer panel and then along second parts of the inner panel.

An inflator provides inflation fluid for inflating the vehicle occupant protection device. When the vehicle occupant protection device is inflated, the first and second portions move away from each other and tension the first and second flexible elongated members. The flexible elongated members resist movement of the device away from the side structure of the vehicle when the device is inflated.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of a vehicle safety apparatus in a deflated condition;

FIG. 2 is a schematic view of the vehicle safety apparatus of FIG. 1 in an inflated condition.

DESCRIPTION OF PREFERRED EMBODIMENTS

Figure 3:
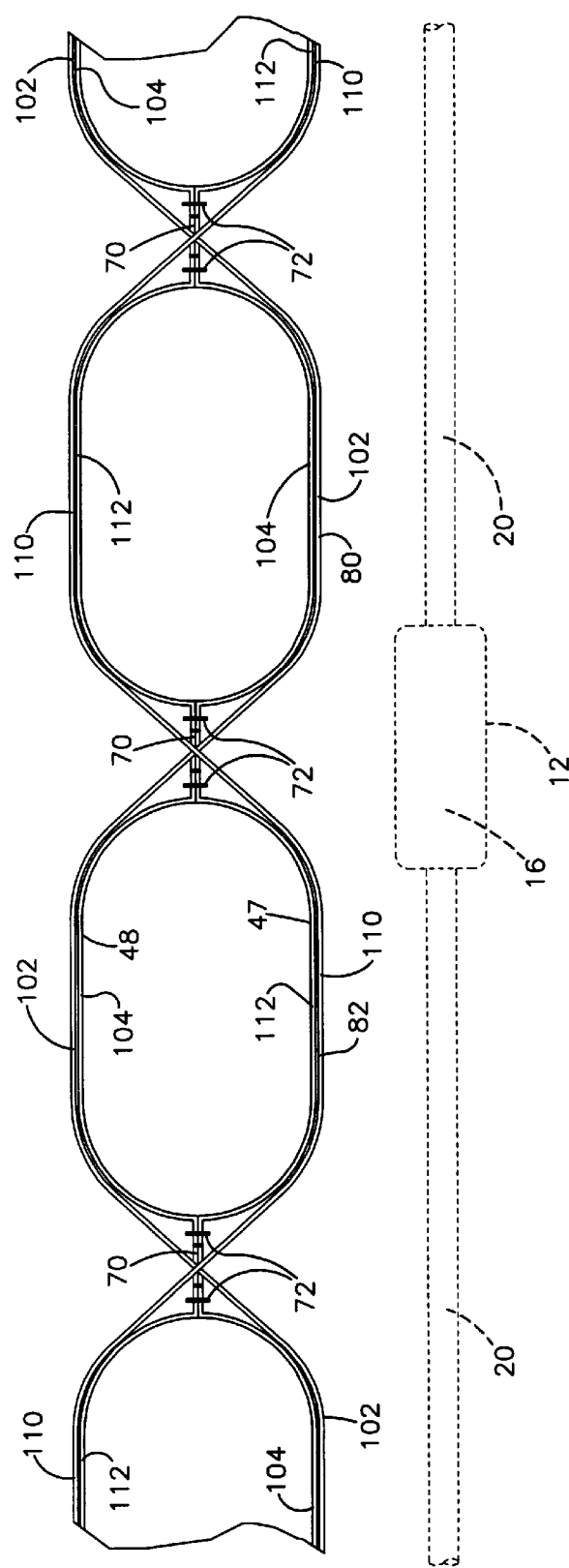
FIG. 3 is a sectional view of the vehicle safety apparatus taken generally along line 3—3 in FIG. 2.

As representative of the present invention, a vehicle safety apparatus 10 helps to protect an occupant of a vehicle 12. As shown in FIGS. 1 and 2, the safety apparatus 10 includes an inflatable vehicle occupant protection device in the form of an inflatable curtain 14 mounted adjacent to the side structure 16 of the vehicle 12 and a vehicle roof 18. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32, which is disposed in the inflatable curtain 14. The second end portion 32 of the fill tube 22 has a plurality of openings (not shown) that provide fluid communication between the fill tube 22 and the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid.

The apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20. Fastening devices 34, such as brackets, connect the fill tube 22, inflatable curtain 14 and housing 26 to the vehicle 12.

The inflatable curtain 14 is formed from a sheet of material that is folded-over to form an outer panel 47 (FIG. 3) and an overlying inner panel 48. The outer panel 47 and inner panel 48 are secured to each other along at least a portion of a periphery 49 (FIG. 2) of the inflatable curtain 14 by known means such as stitching (not shown). When the inflatable curtain 14 is in the inflated condition, the outer panel 47 (FIG. 3) is positioned adjacent to the side structure 16 of the vehicle 12.

It will be recognized by those skilled in the art that the inflatable curtain 14 may have alternative constructions. For example, the outer and inner panels 47 and 48 could be formed from separate sheets of material arranged in an overlying manner and secured together by stitching along the entire periphery 49 of the panels to form the inflatable curtain 14. The panels 47 and 48 could also be woven together along the periphery 48 of the panels.

The inflatable curtain 14 (FIG. 2) has a length as measured in the direction of vehicle travel. The inflatable curtain 14 includes a top edge 50 and an opposite bottom edge 52. The top edge 50 is positioned adjacent to the intersection of the roof 18 and the side structure 16 of the vehicle 12. The inflatable curtain 14 also includes a front edge 54 and an opposite rear edge 56. The front edge 54 is positioned adjacent to an A pillar 60 of the vehicle 12. The rear edge 56 is positioned adjacent to a C pillar 62 of the vehicle 12.

The inflatable curtain 14 includes at least one aperture 70 that extend through the curtain. In the illustrated embodiment, a plurality of apertures 70 are spaced in a row along the length of the inflatable curtain 14 between the top edge 50 and the bottom edge 52. The apertures 70 are positioned adjacent to the bottom edge 52 of the inflatable curtain 14. Each aperture 70 (FIGS. 2 and 3) is encircled by stitching 72 that interconnects the outer panel 47 and inner panel 48. The stitching 72 helps to block leakage of inflation fluid from the inflatable curtain 14 through the apertures 70.

The apparatus 10 (FIG. 2) also includes first and second flexible elongated members 80 and 82. In the illustrated embodiment, the first and second flexible elongated members 80 and 82 comprise straps constructed of a material such as fabric. In the deflated condition of FIG. 1, the first and second flexible elongated members 80 and 82 are stored in the housing 26 along the vehicle roof 28 and side structure 16 of the vehicle 12 above the side windows 20.

The first flexible elongated member 80 has a first end 84 (FIG. 2) and an opposite second end 86. The first end 84 of the first flexible elongated member 80 is fixedly connected to the side structure 16 of the vehicle 12 at a first location 90. The first location 90 is positioned forward of the front edge 54 of the inflatable curtain 14, on or near the A pillar 60 of the vehicle 12. The second end 92 of the first flexible elongated member 80 is secured to the side structure 16 of the vehicle at a second location 92. The second location 92 is positioned rearward of the rear edge 56 of the inflatable curtain 14, on or near the C pillar 62 of the vehicle 12.

The second flexible elongated member 82 has a first end 94 and an opposite second end 96. The first end 94 of the second flexible elongated member 82 is fixedly connected to the side structure 16 of the vehicle 12 at the first location 90. The second end 96 of the second flexible elongated member 82 is secured to the side structure 16 of the vehicle at the second location 92.

Those skilled in the art will appreciate that it may be desirable to position the inflatable curtain 14 between the A pillar 60 and a B pillar 100 of the vehicle 12. In this instance, the second location 92 could be positioned on or near the B pillar 100 of the vehicle 12.

The first flexible elongated member 80 extends from the first location 90 and passes consecutively through each of the apertures 70 in the inflatable curtain 14. The first flexible elongated member 80 extends alternately along the outer panel 47 and the inner panel 48. As illustrated in FIG. 3, the first flexible elongated member 80 has first portions 102 that extend along first parts 104 of the outer panel 47 and then along first parts 104 of the inner panel 48.

The second flexible elongated member 82 extends from the first location 90 (FIG. 2) and passes consecutively through each of the apertures 70 in the inflatable curtain 14. The second flexible elongated member 82 extends alternately along the outer panel 47 and the inner panel 48, opposite the first flexible elongated member 80. The second flexible elongated member 82 has second portions 110 (FIG. 3) that extend along second parts 112 of the outer panel 47 and then along second parts 112 of the inner panel 48.

The vehicle 12 includes a sensor mechanism 120 (shown schematically in FIGS. 1 and 2) for sensing a side impact to the vehicle 12 and/or a rollover of the vehicle 12. The sensor mechanism 120 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 120 provides an electrical signal over lead wires 122 to the inflator 24. The electrical signal causes the inflator 24 to be actuated in a known manner. The inflator 24 discharges fluid under pressure into the fill tube 22. The fill tube 22 directs the fluid into the inflatable curtain 14 (FIG. 2).

The inflatable curtain 14 inflates under the pressure of the inflation fluid from the inflator 24. The housing 26 (FIG. 1) opens and the inflatable curtain 14 (FIGS. 2 and 3) inflates in a downward direction as shown in the drawings and with respect to the direction of vehicle travel. The curtain 14, when inflated, extends along the side structure 16 of the vehicle 12. The inflated curtain 14 is positioned between the side structure 16 of the vehicle 12 and any occupant of the vehicle.

As the inflatable curtain 14 inflates, the curtain expands in a lateral direction, transverse to the length of the curtain. As the inflatable curtain 14 expands, respective first and second parts 104 and 112 (FIG. 3) of the outer and inner panels 47 and 48 move away from each other, thus moving respective first and second portions 102 and 110 of the first and second flexible elongated members 80 and 82 away from each other. Thus, as the inflatable curtain 14 inflates, the first and second flexible elongated members 80 and 82 are tensioned between the first and second locations 90 and 92 (FIG. 2).

In the inflated condition, the tensioned first and second flexible elongated members 80 and 82 resist movement of the inflatable curtain 14 away from the side structure 16 of the vehicle 12. Thus, the first and second flexible elongated members 80 and 82 help maintain the position of the inflated curtain 14 between any occupant of the vehicle 12 and the side structure 16 of the vehicle 12.

Those skilled in the art will recognize that it may be desirable to apply a tension to the inflatable curtain 14 in the downward direction in which the curtain 14 is inflated. In this instance, the first and second locations 90 and 92 may be positioned below the bottom edge 52 of the inflated inflatable curtain 14. As a result, when the inflatable curtain 14 is inflated, the first and second flexible elongated members 80 and 82 tension the curtain 14 in a downward direction as shown in the drawings and with respect to the direction of vehicle travel.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure, said apparatus comprising:

a vehicle occupant protection device which is inflatable into a position between the side structure of the vehicle and a vehicle occupant, said vehicle occupant protection device when inflated having an outer panel positioned adjacent to the vehicle side structure and an opposite inner panel;

at least one aperture extending through said vehicle occupant protection device;

a first flexible elongated member having first and second opposite ends which are connected to the vehicle side structure, said first flexible elongated member extending through said at least one aperture and having first portions extending along a first part of said outer panel of said vehicle occupant protection device and then along a first part of said inner panel of said vehicle occupant protection device;

a second flexible elongated member having first and second opposite ends which are connected to the vehicle side structure, said second flexible elongated member extending through said at least one aperture and having second portions extending along a second part of said outer panel of said vehicle occupant protection device and then along a second part of said inner panel of said vehicle occupant protection device, said second parts of said outer and inner panels being opposite said first parts of said outer and inner panels of said vehicle occupant protection device; and an inflator for providing inflation fluid for inflating said vehicle occupant protection device;

said first and second portions moving away from each other and tensioning said first and second flexible elongated members when said vehicle occupant protection device is inflated, said first and second flexible elongated members resisting movement of said vehicle occupant protection device away from the side structure of the vehicle when said vehicle occupant protection device is inflated.

2. Apparatus as defined in claim 1, wherein said at least one aperture is a row of apertures spaced along said vehicle occupant protection device, said first portions of said first flexible elongated member extending along a plurality of first parts of said outer panel and between said first parts of said outer panel extending along at least one first part of said inner panel, said second portions of said second flexible elongated member extending along a plurality of second parts of said inner panel and between said second parts of said inner panel extending along at least one second part of said outer panel.

3. Apparatus as defined in claim 1, wherein said vehicle occupant protection device is an inflatable curtain having a stored position extending along the side structure adjacent to a roof of the vehicle, said inflatable curtain being inflated in a first direction away from the vehicle roof and extending fore and aft in the vehicle along the side structure of the vehicle, said inflatable curtain having a length measured in the direction of vehicle travel.

4. Apparatus as defined in claim 3, further including a fill tube having a portion located in said inflatable curtain, said inflator being in fluid communication with said fill tube, said inflator, when actuated, providing inflation fluid to said fill tube, said fill tube directing said inflation fluid into said inflatable curtain to inflate said inflatable curtain.

5. Apparatus as defined in claim 2, wherein said apertures are spaced along the length of said vehicle occupant protection device.

6. Apparatus as defined in claim 3, wherein said inflatable curtain expands in a direction transverse to said length of said inflatable curtain when said inflatable curtain is inflated, said outer and inner panels moving away from each other when said inflatable curtain is inflated, said first and second portions being moved away from each other by said outer and inner panels.

7. Apparatus as defined in claim 3, wherein said first end of said first flexible elongated member and said first end of said second elongated member are connected to the vehicle side structure at a first location, said second end of said first flexible elongated member and said second end of said second flexible elongated member being connected to the vehicle side structure at a second location.

8. Apparatus as defined in claim 7, wherein said first and second flexible elongated members are tensioned between said first and second locations when said inflatable curtain is inflated.

9. Apparatus as defined in claim 7, wherein said first location is positioned forward of a front edge of said inflatable curtain and said second location is located rearward of a rear edge of said inflatable curtain.

10. Apparatus as defined in claim 7, wherein said first location is positioned on an A pillar of the vehicle.

11. Apparatus as defined in claim 7, wherein said second location is positioned on a C pillar of the vehicle.

12. Apparatus as defined in claim 1, wherein said first and second flexible elongated members comprise first and second straps of a fabric material.

\* \* \* \* \*